Dec. 10, 1957 C. MYROLD ET AL 2,815,781
STRAW DISINTEGRATOR
Filed July 1, 1954
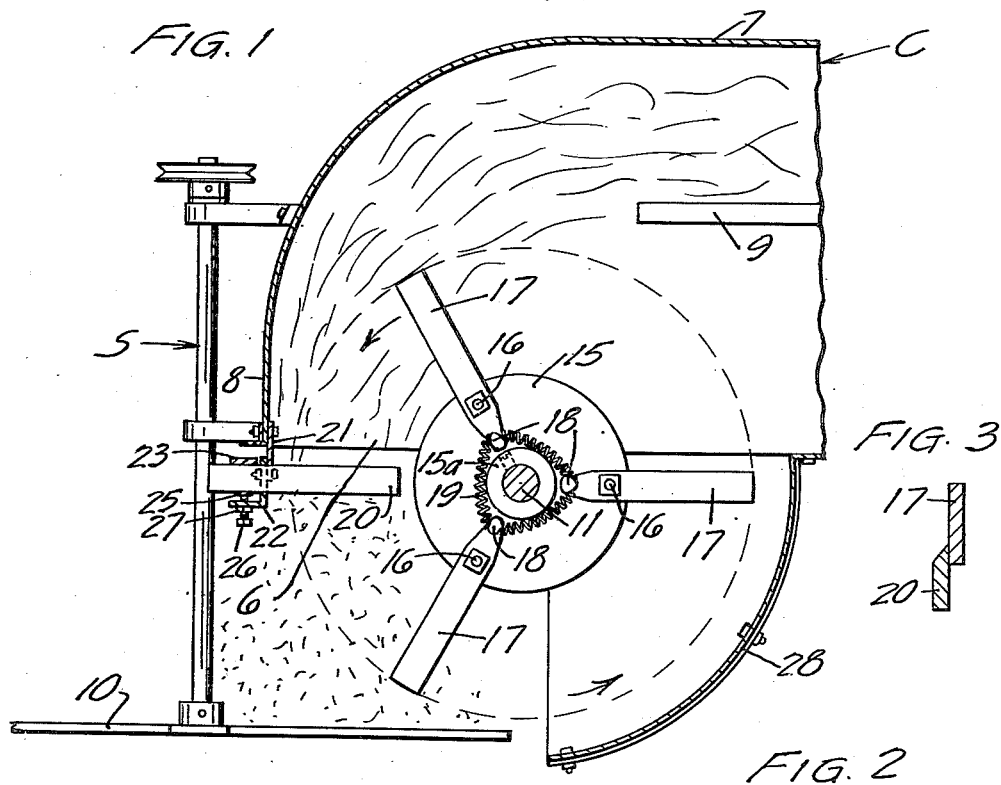
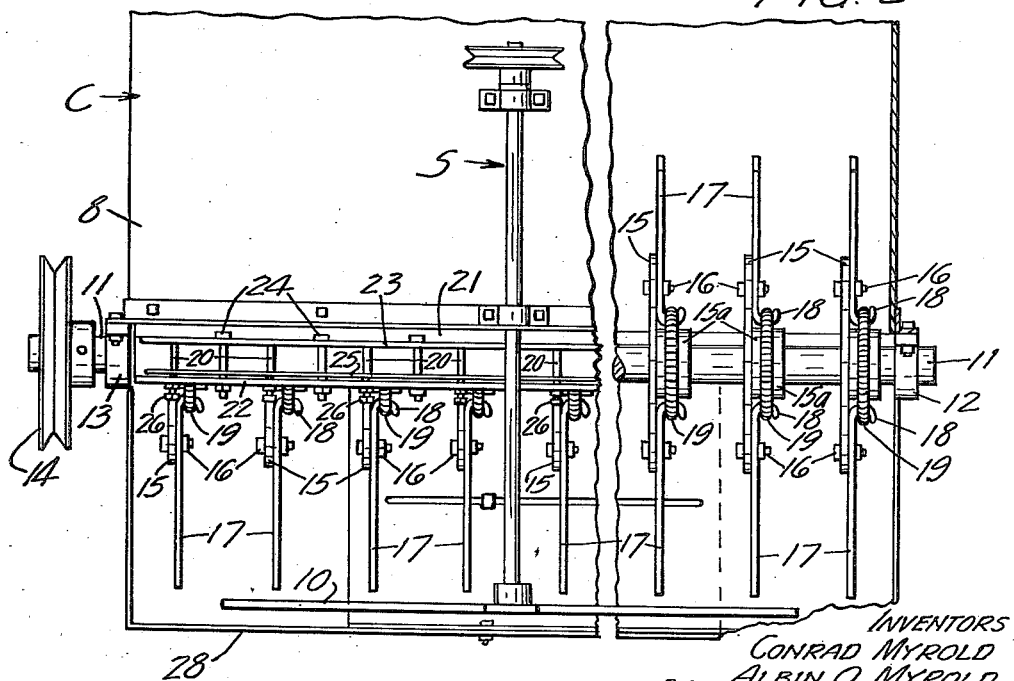
INVENTORS
CONRAD MYROLD
ALBIN O. MYROLD
BY Williamson, Williamson, Schroeder & Adams
ATTORNEYS United States Patent Office 2,815,781
Patented Dec. 10, 1957

2,815,781

STRAW DISINTEGRATOR

Conrad Myrold and Albin O. Myrold, Crookston, Minn.

Application July 1, 1954, Serial No. 440,753

3 Claims. (Cl. 146—117)

This invention relates to straw and stalk disintegrators. More particularly, it relates to devices for use in combination with a combine to more effectively disintegrate and scatter the straw.

Many devices have been designed for disintegrating the straw discharged by a combine so that it will be more finely divided and thus more readily mix in the soil so as to avoid fouling of earth tilling instruments. All these devices to the present date, however, have at least some serious disadvantages. Most of them are quite expensive in that they require considerable material and machining for their construction. As a result they are heavy and the cost is substantial. Most of them require an unnecessarily large amount of power in order to be driven. Most of them plug quite easily when heavy wet clumps of straw pass through them and if provision is made to avoid such plugging, the clump then goes through the device without first having been disintegrated.

Perhaps the most serious disadvantage of the devices which have previously been designed for the disintegration of the straw as it leaves a combine is that the combine itself as it is currently manufactured and sold must be altered in order to accomplish the scattering operation once the disintegrating device has been attached. None of these devices to our knowledge which has proved operatively successful is adapted to utilize the combine and all of its parts just as it is sold by the manufacturer. Most of the combines today are manufactured with a rotary scattering device mounted at the rear of the combine and rotating about a vertcial axis. Most of the disintegrating devices previously designed require the removal of this scatterer and provide other scattering means in lieu thereof. None of them are constructed to utilize the combine just as it is purchased by the farmer and to cooperate with the combine to provide more effective disintegration and scattering without serious modification of the combine. Our invention is designed to overcome these disadvantages and more specifically to enable the farmer to merely attach our device to the combine just as it is purchased and at a minimum of cost, substantially increase the effectiveness of the scattering mechanism of the combine.

It is a general object of our invention to provide a novel and improved straw disintegrating device of inexpensive and simple construction.

A more specific object is to provide an inexpensive and simply constructed disintegrating device capable of being attached to a combine without other modifications of the latter to cooperate with the straw scatterer already provided on the conventional combine by the manufacturer and thereby make the scatterer more effective.

Another object is to provide a novel and improved straw disintegrating device constructed to more effectively avoid plugging resulting from the passage therethrough of a heavy wet clump of straw and necessitating the clump to pass through en masse.

Another object is to provide a novel and improved straw distintegrating device constructed to provide resilience within the cooperating cutter elements without permitting straw to pass therethrough without first having been disintegrated.

Another object is to provide a novel and unique resilient mounting for the rotary knives of the disintegrating device.

These and other objects and advantages of our invention will more fully appear from the following description made in connection with the accompanying drawings wherein like reference characters refer to similar parts through the several views and in which:

Fig. 1 is a longitudinally taken vertical sectional view of a combine having one of our devices mounted thereon, the view being taken transversely through the disintegrating device and showing the combine scatterer in elevation;

Fig. 2 is a rear end elevational view of the same; and

Fig. 3 is a sectional view when one of the rotary blades is in cooperating position with the fixed knife.

One embodiment of our invention is shown in Figs. 1–2 mounted transversely of the discharge opening 6 of the housing 7 of a combine indicated generally as C. The housing 7 has a downwardly sloping rear panel 8 which in cooperation with the shaker 9 of the combine directs the straw downwardly and rearwardly onto a rotary scatterer indicated generally as S. This rotary scatterer S is mounted for rotation on the outside of the housing 7 as shown and driven by rotary power means (not shown) normally associated with the combine. The scatterer blades 10 are positioned below the discharge opening 6 of the combine C and extend forwardly beneath the same when rotating to engage the straw discharged through the opening 6.

Our disintegrating device is comprised of an elongated shaft 11 mounted transversely of the combine C by a pair of bearings 12 and 13 which are connected to the opposite sides of the housing 7 in the conventional manner. The shaft 11 carries a pulley 14 at one of its ends outside the housing 7 which is connected to a source of rotary power (not shown) normally associated with the conventional combine. The pulley 14 is fixedly secured to the shaft 11 so as to drive the same.

Mounted on the shaft 11 and fixedly secured thereto by set screws, or by some other conventional means such as through the use of a key, is a plurality of discs 15. These discs 15 have laterally extending bosses 15a at one of their sides. At the peripheral portions of each disc 15 there is pivotally mounted by means of a bolt 16 a rotary cutter element or balde 17. These cutter elements 17 are pivoted between their ends and have their inner ends curved to form a hook element 18, the hook extending axially of the shaft 11 and outwardly from the disc. A circular spring member 19 encircles the shaft and each of the hook members 18 and normally holds each blade 17 so that it extends radially outwardly from the shaft but can pivot in a direction opposite to the direction of rotation of the shaft 11 which is indicated by the arrows in Fig. 1.

Fixedly mounted on the rear panel 8 of the housing 7 and transversely of the combine is a cooperating set of fixed cutter elements or knives 20. These knives 20 are arranged to extend forwardly from the panel 8 and across the discharge opening 6. They are secured to the panel 8 by an elongated plate member 21 which is bolted to the panel 8 as best shown in Fig. 1. An elongated angle iron 22 is in turn bolted to the lower portions of the plate 21 as clearly shown in Fig. 1. Notches are cut in the angle iron 22 and in the lower edge of the plate 21 to accommodate the knives 20 so that they may extend therethrough across the discharge opening of the combine.

The outer end portions of the knives 20 extend outwardly of the panel 8 as best shown in Fig. 1 and are fixedly secured to the angle iron 22 through the combinative action of an elongated bar 23 which rests across the upper edge of each of the knives 20 as shown in Fig. 1. This bar is loosely secured to the angle iron 22 by a plurality of bolts 24. An elongated thin strap 25 extends across the lower edges of the knives 20 and this strap is urged upwardly by a plurality of cap screws which extend upwardly through the angle iron 22 as shown in Fig. 1. Burrs 27 serve to maintain the cap screws in proper position once they have been tightened to hold the strap 25 firmly against the knives 20.

A shield member 28 is secured to the underside of the housing 7 as best shown in Fig. 1 as a safety feature.

In use the straw is directed rearwardly and downwardly by the shaker 9 and the panel 8 of the combine C. As shown, our disintegrating device is mounted across the discharge opening of the combine below the shaker 9 and sufficiently far forwardly so that as the cutter elements 17 rotate with the shaft 11, they tend to augment the direction of movement already imparted to the straw by the combine C. In other words, the cutter elements 17 are not required to first change the direction of the straw and thereafter perform the cutting or breaking action. On the contrary, they tend to augment and increase the speed of the straw in flinging it downwardly against the fixed knives 20. As a result there is less power required to perform the disintegrating action than is required when the rotary cutter elements operate in a direction opposite to the normal flow of the straw from the combine.

The straw is carried by the rotary cutter elements 17 against the knives 20 and at that point the knives 20 and the blades 17 cooperate to effectively disintegrate the straw and finely divide the same so that when it descends upon the scattering elements 10 of the scatterer S a much more effective scattering action is accomplished. Also, of course, the straw is thereby cut up so finely that it will no longer provide any serious factor in the fouling of ground working instruments such as plows and the like.

In the event that a foreign object or a clump of wet heavy straw passes through the combine, no serious damage will result to the disintegrating device for one of the blades 17 will first strike it and attempt to sever it in cooperation with the knife 20. If it is so tough that it cannot be chopped off as a result of the impact and cooperative cutting action between these two elements, the blade 17 will swing rearwardly in a direction opposite to the direction of rotation of the shaft 11 and will slide off of the clump severing only a portion thereof. The next successive blade 17 will likewise strike the clump of heavy wet straw and because of its momentum and the cooperating cutting action with the knives 20, will sever an additional portion of the material. This action will be repeated until finally the clump will be completely disintegrated and will pass through in finely divided relation to the scattering elements 10 where it will be effectively scattered. Each of the rotary blades 17 will swing to a position such as is shown in broken lines in Fig. 1 when such a clump of wet material is encountered and the spring 19 will enable it to do so. The blade, of course, will pivot around the bolt 16. As soon as the outermost end of the blade passes the knife 20, it will immediately be returned to radial position by the spring 19.

Thus it can be seen that we have provided a novel and improved disintegrating device which is extremely simple in construction and operation. Because it is so simple it can be manufactured from a minimum of material and with a minimum of labor and hence the cost is relatively nominal as compared to other disintegrating devices.

Even more important is the fact that our disintegrating device can be quickly and easily attached to a combine and that the combine need not be modified otherwise in order to perform the scattering function. Our disintegrating device cooperates with the scattering device which is already on the combine as sold to the farmer. In other words, our disintegrating device cooperates with the scatterer which is provided normally as a standard part of the combine and there is no need for removing the scatterer and providing a substitute scattering mechanism.

It will also be noted that we have provided rotary cutter elements mounted so as to eliminate serious damage being done to the disintegrating device if a foreign object such as a stick passes through the combine. Our scattering device also eliminates plugging of the machine by wet clumps of straw and eliminates the need for permitting such clumps to pass through the machine without being disintegrated. Our scattering device submits such a clump to repeated cutting actions until the clump is completely disintegrated. At the same time, it eliminates the rigidity of the rotary cutter elements and thereby avoids the jarring and serious damage which normally occurs to such a device when the knives are fixedly mounted on the shaft.

It will also be noted that our rotary cutter knives are provided with positive resilient mechanism for maintaining the knives in radially extending position. This mechanism augments the normal tendency for such blades to extend radially as a result of centrifugal force. Therefore, the blades are urged to radially extending position more strongly than other types of cutting mechanisms where the rotary elements may be pivotally mounted.

It should be noted that all that is required to attach our scattering device to a combine is to secure the shield 28 to the housing 7 and to secure the shaft to the opposite sides of the housing by means of bearings 12 and 13. Thus the entire unit can be quickly and easily attached to a conventional combine to cooperate with its scatterer and provide simple and inexpensive, but highly efficient, disintegrating and scattering mechanism.

It will, of course, be understood that various changes may be made in the form, details, arrangement and proportions of the parts without departing from the scope of our invention which consists of the matter shown and described herein and set forth in the appended claims.

What is claimed is:

1. A straw and stalk disintegrating device for attachment to the discharge opening of the housing of a combine having in combination an elongated shaft, structure for rotatably mounting said shaft in substantially horizontal position transversely across the discharge opening of said combine, a set of axially arranged rotary cutter members pivotally connected intermediate their ends with said shaft for rotation therewith, each of said members having its inner end bent into hook elements, a single spring member surrounding said shaft and said hook elements and engaging the latter and normally holding said cutter elements thereby in radially extending relation to said shaft, and a second and cooperating set of fixed cutter elements adapted to be operatively mounted on the housing of said combine adjacent its discharge opening rearwardly of said shaft in cooperating relation with said first set of cutter elements to effectively disintegrate the straw discharged from the combine.

2. A straw and stalk disintegrating device for attachment to the discharge opening of the housing of a combine having in combination an elongated shaft, structure for rotatably mounting said shaft in substantially horizontal position transversely across the discharge opening of said combine, a set of axially arranged rotary cutter elements pivotally connected intermediate their ends with said shaft for rotation therewith, a single spring member surrounding said shaft and connected to the inner ends of said rotary cutter elements and normally holding the same in radially extending relation to said shaft, and a second and cooperating set of fixed cutter elements adapted to be operatively mounted on the housing of said combine adjacent its discharge opening rearwardly of said shaft in cooperating relation with said first set of cutter elements to effectively disintegrate the straw discharged from the combine.

3. A straw and stalk disintegrating device for attachment to the housing of a combine having a lower edge defining a discharge opening, comprising a shaft disposed transversely across said discharge opening of said housing, means rotatably supporting said shaft closely adjacent to and below said lower edge of the housing, a set of axially arranged rotary cutter elements pivotally connected intermediate their ends with said shaft for rotation therewith, a single yieldable element engaging the inner ends of said cutter elements axially inwardly of their pivotal connection with said shaft and normally holding the same in radially extending relation to said shaft, a fixed cutter element secured to said housing and extending in generally parallel spaced relation below said lower edge of the housing inwardly across said discharge opening substantially radially with respect to said shaft, said fixed cutter element terminating in spaced relation to said shaft but disposed in overlapping relation to the circular path of motion of said rotary cutter elements but to one side thereof so that said rotary cutter elements pass in close adjacency to said fixed cutter element, and means for rotating said shaft so that said rotary cutter elements pass through said discharge opening outwardly of said housing and past said fixed cutter element to disintegrate straw discharged from said combine.

References Cited in the file of this patent

UNITED STATES PATENTS

| | | |
|---|---|---|
| 571,588 | Albrecht | Nov. 17, 1896 |
| 1,057,283 | Scherrer | Mar. 25, 1913 |
| 1,259,089 | Felcyn | Mar. 12, 1918 |
| 1,348,751 | Searby | Aug. 3, 1920 |
| 1,959,465 | Dryfoos | May 22, 1934 |
| 2,239,486 | Edwards | Apr. 22, 1941 |
| 2,281,846 | Klein | May 5, 1942 |

FOREIGN PATENTS

| | | |
|---|---|---|
| 647,077 | Germany | June 26, 1937 |